Figures 1, 2:
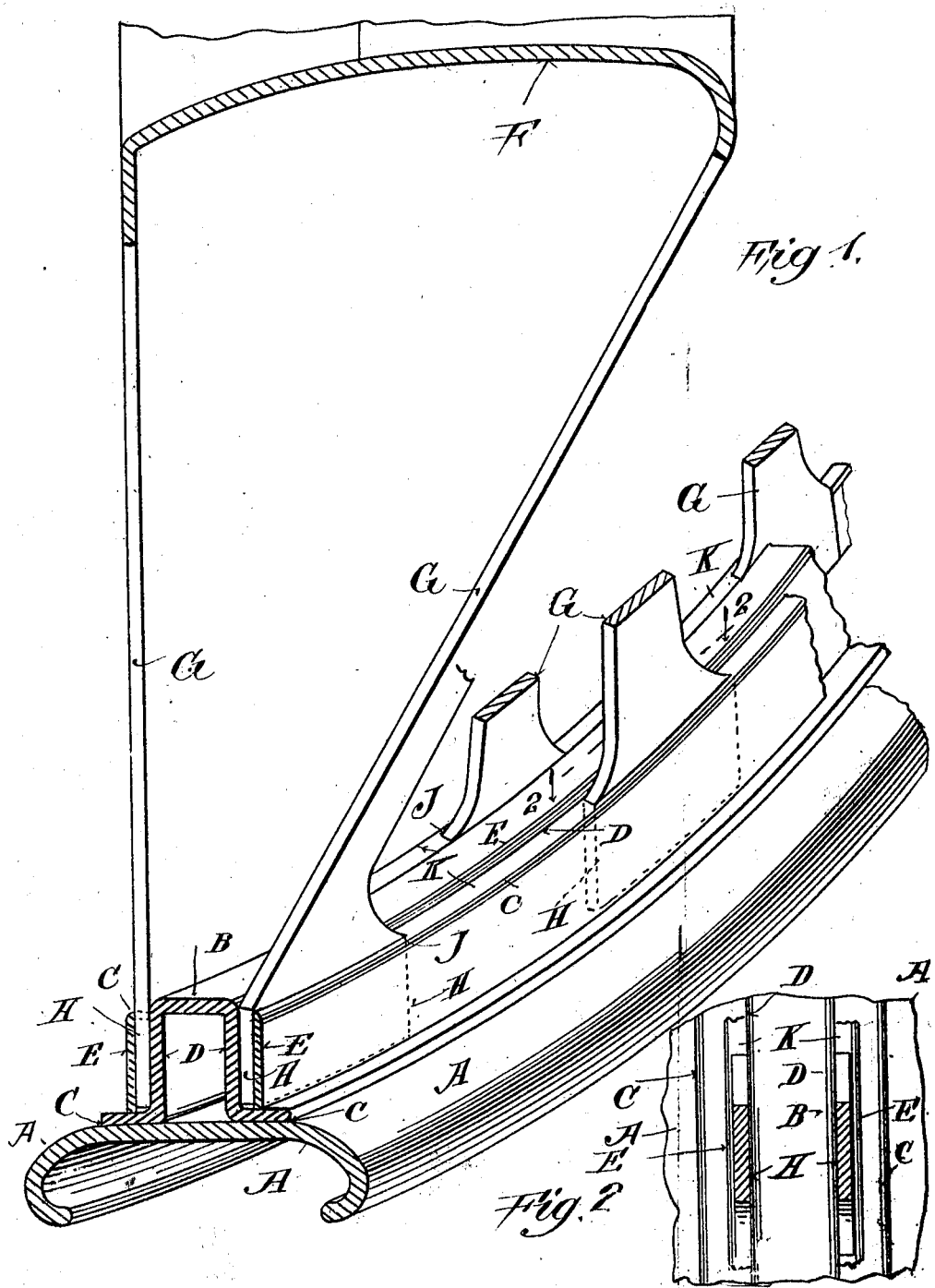

J. LEDWINKA.
SHEET METAL WHEEL.
APPLICATION FILED MAR. 2, 1917.

1,311,979.

Patented Aug. 5, 1919.

Inventor
Joseph Ledwinka
by his atty Samuel E. Darby

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

SHEET-METAL WHEEL.

1,311,979.   Specification of Letters Patent.   Patented Aug. 5, 1919.

Application filed March 2, 1917. Serial No. 151,943.

*To all whom it may concern:*

Be it known that I, JOSEPH LEDWINKA, a citizen of the United States, residing at Philadelphia, county of Philadelphia, State of Pennsylvania, have made a certain new and useful Invention in Sheet-Metal Wheels, of which the following is a specification.

This invention relates to sheet metal wheels.

The object of the invention is to provide a construction of sheet metal wheel which is simple in structure, strong, durable and economical to manufacture.

The invention consists substantially in the construction, combination, location and relative arrangement of parts, all as will be more fully hereinafter set forth, as shown in the accompanying drawing, and finally pointed out in the appended claims.

In the drawing, Figure 1 is a view in perspective, parts broken off and parts in section showing a structure of sheet metal wheel embodying the principles of my invention.

Fig. 2 is a broken detail view in section on the line 2, 2, Fig. 1, looking in the direction of the arrows, and showing the manner of connecting the spoke ends to the rim or felly structure.

In carrying out my invention a sheet of steel is stamped or cut to the required shape and dimensions to form the hub sleeve and spokes, the latter being formed by slitting the opposite edges of the stamping. The stamping is then rolled into tubular form with the meeting ends of the portion to form the hub sleeve suitably secured together. The portions of the stamping formed by slitting the edges thereof are then bent out radially from the ends of the hub sleeve to form the wheel spokes integral with the hub sleeve. These operations are exceedingly simple and easily and expeditiously accomplished.

In the drawing F designates the tubular hub sleeve portion and G, the spokes which are integral therewith, in a sheet wheel structure produced as above described. In practice, and in order to secure additional strength I prefer to form the spokes with enlarged outer or free ends, as indicated at H. The free ends H of the spokes are applied against and suitably secured, as by welding, to the sides D of a ring shaped sheet metal stamping B of channel shape in cross section with lateral flanges C. The channel of this member presents outwardly. A rim member A of any desired type or form is applied to and secured against the radially outer surfaces of the lateral flanges C of the stamping B. I have shown a standard form of clencher rim A, but my invention is not to be limited or restricted in this respect as other forms and types of rim are applicable for use in connection with my invention with equal facility and advantage. The rim member A, whatever its form or type is secured by welding or otherwise against the radially outer surfaces of the lateral flanges C of the channel stamping B.

If desired, and in order to conceal the spoke ends and present a neat finished appearance, as well as to add strength and rigidity to the felly structure sheet metal ring stampings E are applied against the sides of the spoke ends, and welded or otherwise secured thereto. In this case it may sometimes be preferable to form off-set or depressed seats J in the ring stampings E, to receive the sides of the spoke ends so that the portions K of the ring stampings intermediate adjacent spokes will lie against and may be welded or otherwise secured to the sides D of the channel stamping B, thus forming a very strong and rugged but cheap and economical felly structure which is of neat and finished appearance.

It will be understood, of course, that the set of spokes G at one end of the hub sleeve F will be applied and secured to one side of the channel stamping B, while the set of spokes at the other end of the hub will be applied and secured to the other side of the channel stamping.

It will be seen that all the parts composing the wheel and felly structure are of simple shape capable of being readily, easily and quickly formed of sheet steel stampings with great economy of material and labor, and the assembly operations are equally simple and can be accomplished expeditiously and economically, thus resulting in the production of a strong durable and efficient sheet metal wheel for use on automobiles or other vehicles with a minimum of cost of manufacture.

Various changes in the details of structure, arrangement and relation of parts will readily occur to persons skilled in the art and still fall within the spirit and scope of my invention. I do not desire, therefore, to be limited or restricted to the exact details shown and described.

But having now set forth the object and nature of my invention, and a structure embodying the principles thereof, what I claim as new and useful, and of my own invention, and desire to secure by Letters Patent, is:—

1. In a sheet metal wheel, a hub sleeve portion having integral spokes at the respective ends thereof, in combination with a ring of U-shape in cross section, the channel of said ring presenting outwardly, the outer or free ends of the spokes being applied flatwise against and secured to the outer radial side surfaces of said channel ring, and a rim member secured to the outer periphery of said channel ring.

2. In a sheet metal wheel, a hub sleeve portion having integral spokes at the ends thereof, in combination with an outwardly presenting channel member having lateral edge flanges, the free ends of the spokes at the opposite ends of the hub sleeves, respectively, being applied against and secured to the respective sides of said channel member, and abutting endwise against the inner surfaces of said lateral edge flanges, and a rim member applied against and secured to the outer surfaces of said flanges.

3. In a sheet metal wheel, a hub sleeve portion having integral spokes at the ends thereof, in combination with a ring stamping of channel shape in cross-section the channel thereof presenting outwardly, the outer free ends of the spokes being applied against and secured to the sides of said channel shaped stamping, and a rim member applied against and secured to the radially outer surface of said channel stamping.

4. In a sheet metal wheel, a hub sleeve portion having integral spokes at the ends thereof, in combination with an outwardly presenting channel shaped felly stamping to the respective sides of which the outer ends of the spokes are applied and secured, ring stampings applied against the outer side surfaces of the spoke ends to conceal the latter, and a rim member applied against and secured to the radially outer surface of the felly stamping.

5. In a sheet metal wheel, a hub sleeve portion having integral spokes at the ends thereof, in combination with a felly stamping to which the outer ends of the spokes are applied and secured, ring stampings applied against the outer side surfaces of the felly stamping and over the sides of the spoke ends to conceal the latter, said ring stampings having off-sets or depressions forming seats to receive the spoke ends, and a rim member applied against and secured to the radially outer surface of the felly stamping.

6. In a sheet metal wheel a hub sleeve portion having integral flat spokes at the ends thereof, said spokes having their outer or free ends extended in the direction of the width thereof, in combination with a ring stamping of channel shape in cross section, the channel thereof opening radially outwardly, said stamping having laterally extending edge flanges, the extended free ends of the spokes being applied flatwise against and secured to the respective sides of said stamping, and a rim member applied against and secured to the radially outer surfaces of said flanges.

7. In a sheet metal wheel a hub sleeve portion having integral flat spokes at the ends thereof, said spokes having their outer or free ends extended in the direction of the width thereof, in combination with a ring stamping of channel shape in cross section, the channel thereof opening radially outwardly, said stamping having laterally extending edge flanges, the extended free ends of the spokes being applied flatwise against and secured to the respective sides of said stamping, ring stampings applied against the outer sides of the enlarged spoke ends to conceal the latter, and a rim member applied against and secured to the radially outer surfaces of said flanges.

In testimony whereof I have hereunto set my hand in the presence of the subscribing witnesses, on this 28th day of February A. D., 1917.

JOSEPH LEDWINKA.

Witnesses:
 EDW. R. HESS,
 ROBERT R. PARMENTIER.